(12) United States Patent
Chatani et al.

(10) Patent No.: US 7,010,761 B2
(45) Date of Patent: Mar. 7, 2006

(54) CONTROLLER SELECTABLE HYPERLINKS

(75) Inventors: Masayuki Chatani, Sunnyvale, CA (US); Nobuhiro Komata, Tokyo (JP)

(73) Assignee: Sony Computer Entertainment America Inc., Foster City, CA (US)

( * ) Notice: Subject to any disclaimer, the term of this patent is extended or adjusted under 35 U.S.C. 154(b) by 185 days.

(21) Appl. No.: 09/982,555

(22) Filed: Oct. 18, 2001

(65) Prior Publication Data

US 2003/0076344 A1    Apr. 24, 2003

(51) Int. Cl.
*G06F 3/00* (2006.01)
(52) U.S. Cl. .................. 715/861; 715/711; 715/859
(58) Field of Classification Search ........ 345/859, 345/860, 768, 711, 808; 715/861, 859, 860, 715/768, 711, 808
See application file for complete search history.

(56) References Cited

U.S. PATENT DOCUMENTS

| | | | |
|---|---|---|---|
| 5,920,304 A * | 7/1999 | Berstis | 345/145 |
| 6,018,345 A * | 1/2000 | Berstis | 345/859 |
| 6,154,205 A | 11/2000 | Carroll et al. | |
| 6,609,979 B1 * | 8/2003 | Wada | 463/43 |
| 6,633,310 B1 * | 10/2003 | Andrew et al. | 345/728 |
| 6,664,990 B1 * | 12/2003 | Bates et al. | 345/857 |
| 6,670,970 B1 * | 12/2003 | Bonura et al. | 345/768 |

FOREIGN PATENT DOCUMENTS

| | | |
|---|---|---|
| EP | 0 816 987 | 1/1998 |
| JP | 1 120 703 | 8/2001 |

OTHER PUBLICATIONS

Kinghorn, "Enhanced On-Screen Displays for Simpler TV Control" IEEE Transactions on Consumer Electronics, vol. 38, No. 3, Aug. 1992, pp. 725-733.
PCT Written Opinion dated May 20, 2005 from the corresponding International Application PCT/US02/33066.
International Preliminary Report of Patentability dated Jul. 22, 2005.

* cited by examiner

*Primary Examiner*—John Cabeca
*Assistant Examiner*—Dennis G. Bonshock
(74) *Attorney, Agent, or Firm*—Katten Muchin Rosenman LLP

(57) ABSTRACT

A data processing system for connection to a network utilizing a guidance diagram overlay on a network page with selectable options associated with input controller keys to facilitate network navigation and a method for rendering a guidance diagram overlay on a network page.

16 Claims, 9 Drawing Sheets

 Download
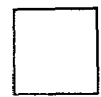 Print Out
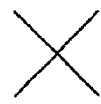 Cancellation
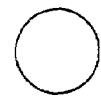 Enter
Fig. 3A

CONTROLLER SELECTABLE HYPERLINKS

This invention relates to network systems, and more particularly, to the utilization of a manual controller for selection of hyperlinks displayed on a monitor connected as part of a network system.

BACKGROUND OF THE INVENTION

In network systems, such as the Internet, and the like, individual users are connected through network servers to download web sites associated with a particular URL address. Typical web sites contain hyperlinks to other URL addresses. Such hyperlinks can be a specific phrase, word or symbol, which transfer the user to another element of the same document, another hypertext document, a different file or a different web site location. These hyperlinks can be in the form of individual words, advertising banners or the like.

The typical input device for selecting a particular hyperlink is the mouse. Using the mouse, a pointer movable along the screen can be directed to the particular hyperlink, and thereafter clicking a switch on the mouse at a pointer location makes the selection of that hyperlink. By selecting such hyperlink, the user can connect to another server location or website.

Where the hyperlink is, by way of example, a banner advertisement, selecting the particular banner advertisement on one web site will move the user to the web site of the advertiser of the banner. Thereafter, on the new web site location, the user may have to go through a number of steps in order to place an order, download material, or carry out some other specific instruction. Thus, it normally will take a number of clicks before a final product is ordered, document downloaded, e-mail sent, or other interactive instruction completed.

A further problem that exists with current systems is that navigation is dependent upon the use of a mouse. The mouse is an instrument that permits easy manipulation of the pointer on the screen. By rolling the mouse along the mouse pad, it is easy to position the pointer on the screen and select the particular desired hyperlink desired.

However, currently there are many types of network input devices, other than traditional desktop or laptop personal computers (PCs), that have network access capabilities. For example, hand-held personal organizers such as Palm Pilots and Handspring Visors, televisions sets, home entertainment systems and the like are all now being utilized as input devices to the Internet. Most of these devices do not utilize a mouse device. Instead of a mouse, these devices typically make use of directional buttons to position the pointer on the web pages. On-screen navigation about web pages is complicated as it is more difficult to specifically orient the pointer to the exact location desired in selecting a particular hyperlink. Thus, use of these devices to navigate a network, such as the Internet, can be quite cumbersome and can become rather time consuming.

SUMMARY OF THE INVENTION

It is accordingly, an object of the present invention to provide a network connection system utilizing an input controller with a key pad for facilitating hyperlink selection, without the need for utilizing a mouse and rolling the mouse along the mouse pad.

A further object of the present invention is to provide a network connection system having hyperlinks wherein guidance diagrams are displayed directly overlying the screen images when a pointer passes over a hyperlink.

Yet a further object of the present invention is to provide a guidance diagram as an overlay associated with a hyperlink for providing a plurality of selectable options, each option having an icon associated with it, with the icon corresponding to a key pad of a controller input unit.

In accordance with the present invention, there is provided a data processing system capable of connection to a network wherein a guidance picture with selectable options associated with specified entry keys is generated when a pointer is passed over a hyperlink on the network page.

BRIEF DESCRIPTION OF THE DRAWINGS

In the drawings;

FIG. 3A shows an example of possible standardized menu options for the corresponding buttons on the controller;

DESCRIPTION OF PREFERRED EMBODIMENT

Figure 1:
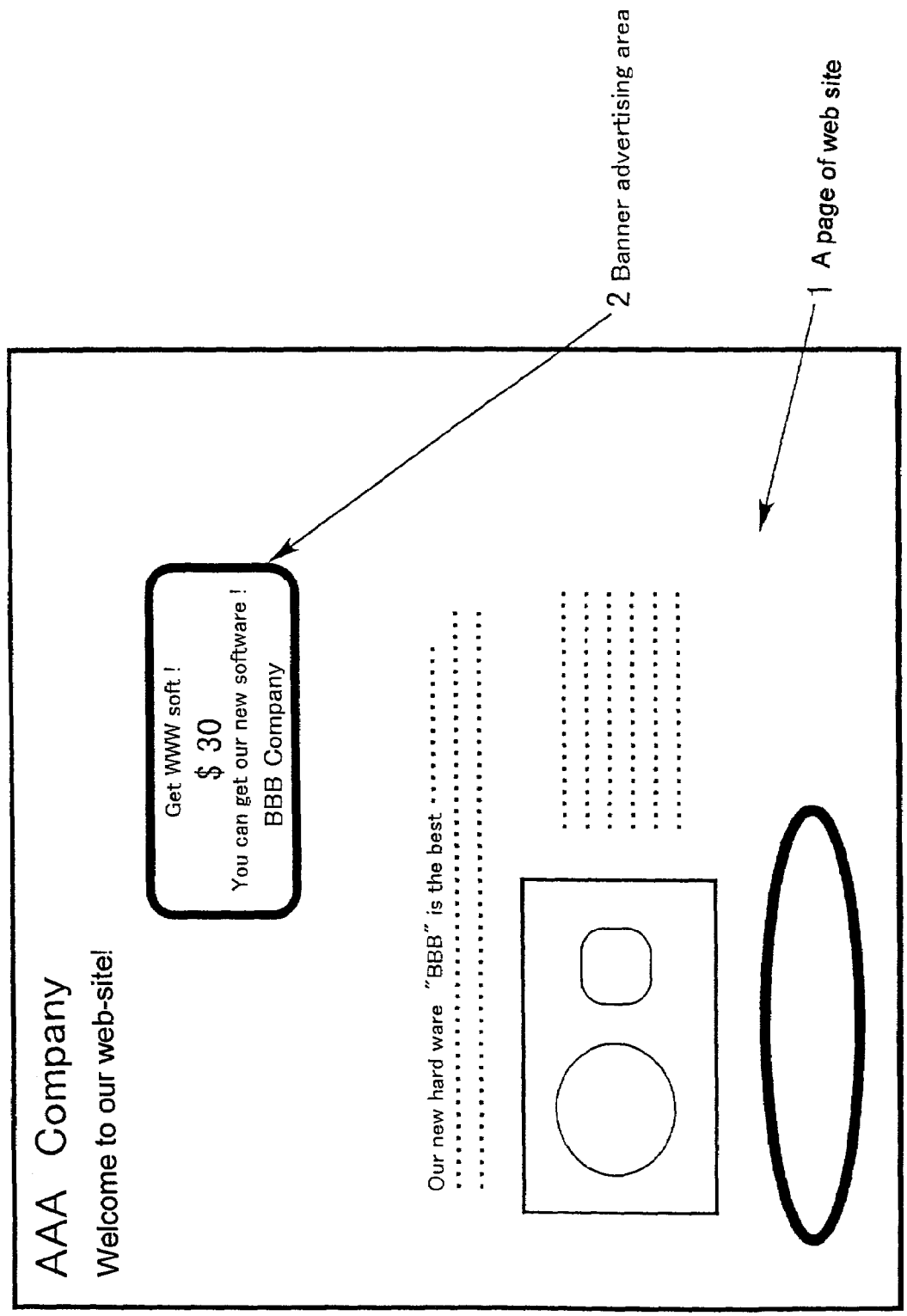
FIG. 1 shows AAA Company's web site with a banner advertisement of BBB Company.

Web pages on a network, such as the Internet, typically have hyperlinks embedded in them. These hyperlinks are used to connect or "link" the user to other web pages on the network, which may be from the same source as the initial web page, for example to provide additional information on a particular subject, or which may be for an unrelated second source, for example to connect to the web site of an advertiser.

The present invention makes use of an input device, such as a game controller. With such devices, it is possible to control a pointer moving across a screen by using the up-down-left and right keys on the controller. However, it is not that easy to manipulate the pointer across the screen using those keys. In addition to the directional keys, the controller also includes various other control buttons and keys which are typically utilized in controlling a game. The present invention makes use of those individual game control buttons to make selections associated with a particular hyperlink.

In accordance with the present invention, as the pointer floats across the screen, each time it passes over a particular identified hyperlink, a guidance picture will immediately appear on the screen overlaid on the existing web site image. So long as the pointer remains associated with that hyperlink, the overlaid guidance diagrams will be presented. The guidance diagram does not obstruct the normal operation of the web site—the web site continues its normal operation behind the navigational guidance diagram As the pointer moves away from the hyperlink, the guidance diagram will disappear from the screen. When the pointer moves to another identified hyperlink, a new guidance diagram associated with that new hyperlink appears as a new overlay on the screen.

Each of these guidance diagrams typically provides a selection of options associated with the particular hyperlink on which the pointer is directed. Each option is identified with an icon as well as the textual description of the option. The icons that are used to identify these options correspond to particular control buttons on the controller. Accordingly, while the pointer is still addressing that particular hyperlink, by depressing the particular button on the controller represented by an icon on the guidance diagram, the option associated with the particular button is selected.

By providing the guidance diagram with a number of options directly overlaid on the screen and associated with the particular hyperlink, the user can save a number of steps that he would normally have to undergo to navigate web sites and networks using existing techniques. At present, in selecting a particular hyperlink, the user would automatically be directed to another URL location. At the second URL location it would be necessary for him to make the particular selection of options that he desires. However, by providing the options as an overlay directly on the initial web site location of the hyperlink of interest, the user can automatically select the particular option without having to first transfer to a second hyperlink location to perform a desired action related to the hyperlink.

For example, if the hyperlink at the first location corresponds to a banner advertisement, typically using a mouse, a user clicks on the banner advertisement and is sent to a different URL location associated with the advertiser of the banner. At the second location, the user must then select whether to download information, send e-mail, or other further selections. Using the guidance diagrams, however, a plurality of options are displayed as an overlay directly on the initial web site location associated with the banner. For example, these can be four icons positioned quadralaterally about the banner hyperlink—each icon associated with a particular option. Thus, on the same web site as the hyperlink itself, a series of options are provided directly to the user as part of the guidance diagram without the need to first transfer to the new URL location to select an option.

In addition, the user need not move the pointer to make a selection of any of these options. While simply keeping the pointer directed on the particular banner advertisement, the user can depress the particular key associated with one of the icons/options in the guidance diagram and thereby make the selection of that particular option directly on the original web site location.

The particular guidance diagram associated with a specific banner or other hyperlink is downloaded from the host server of the web site accessed by a user. Typically, when a web site is accessed, data for the formation of the web page, including information pertaining to hyperlinks embedded in the web page, are communicated to the user's location. The information for a particular guidance diagram associated with each of the identified hyperlinks on a web page can be downloaded to a user's location to be stored in a data file.

The download of information from the server can take place either in one download or in multiple downloads. For example, where banners are refreshed at regular intervals at a web site, each time the banner information for the refreshing of a web page is downloaded from the server, the associated guidance diagram is also downloaded from the host server. Alternatively, as discussed above, all the information for all the hyperlinks including information for the associated guidance diagrams can be downloaded initially from the host server at the time information is downloaded for the formation of the web page.

The particular association between a hyperlink and a guidance diagram can be stored at a data file associated with the user and his input controller. These can be identified by any means of identifying the particular banner. By way of example, it can be identified by the particular identification of the location coordinates on the screen so that when the pointer points to those particular location coordinates, the data file is interrogated and the particular guidance picture, including the icons, the particular selection of options and their location around the hyperlink, are all derived from the data file and then displayed as an overlay on the screen.

Other means for identifying the particular banner can be used; such as a corresponding name of the banner, a pre-identified location of the banner or other means of entry into the data file can be used to identify the guidance picture associated with that particular hyperlink.

More particularly, with reference to FIG. 1, there is shown at 1 a web page. That web page is identified to a first company listed as AAA Company. The web page contains specific information associated with the web site and also includes a particular banner advertising area 2. The particular banner advertisement relates to the purchase of a product at a second web site having a different URL location and associated with a separate company identified herein as BBB Company.

Figure 2:
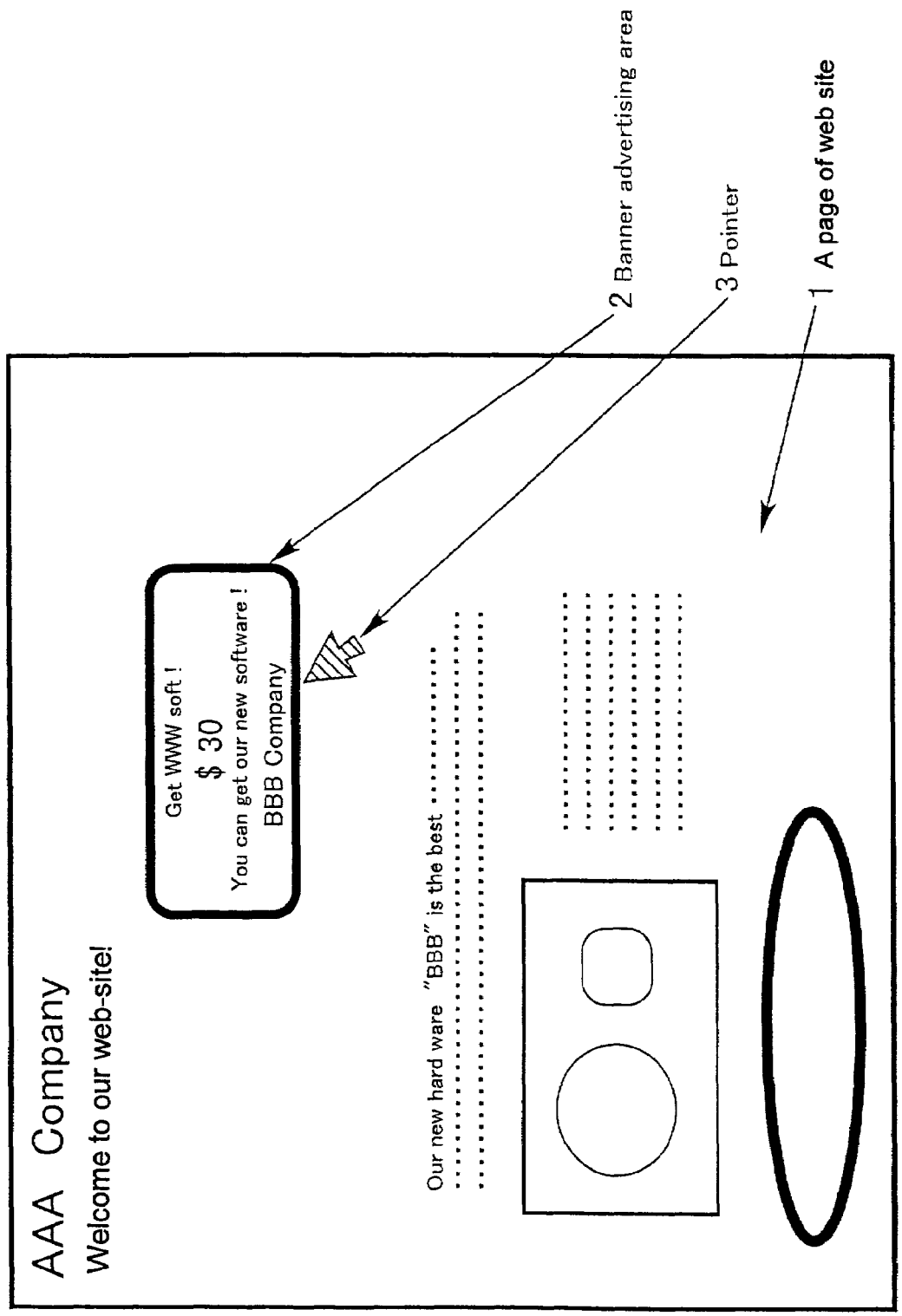
FIG. 2 shows AAA Company's web site with pointer oriented over banner advertisement.
Figure 4:
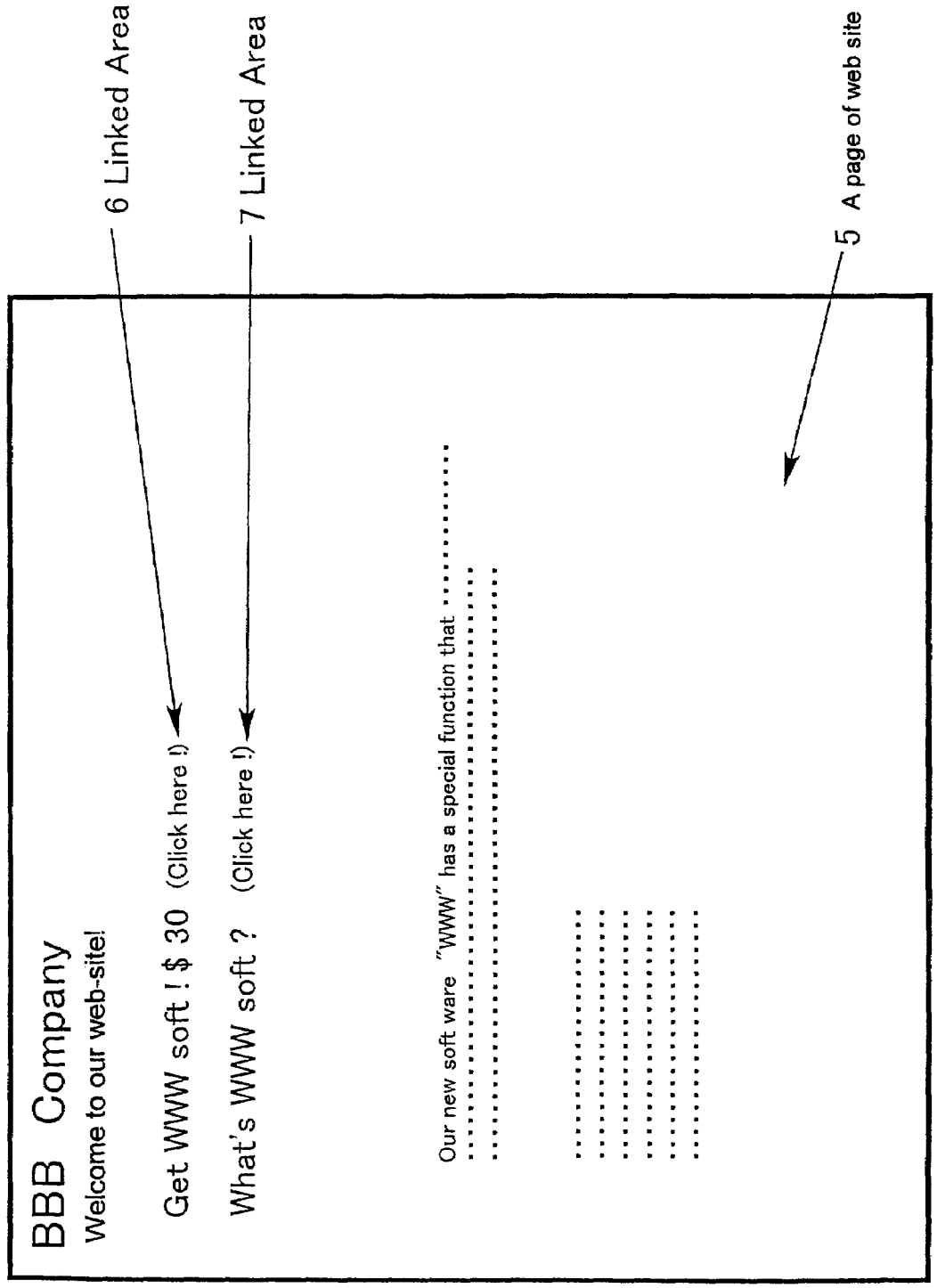
FIG. 4 is the web site of the advertiser BBB Company with hyperlinks.

The typical method of selecting the hyperlink identified by banner 2 is the use of a pointer 3, as shown in FIG. 2. Using the existing technology, the pointer is positioned over the banner and hyperlink using a mouse and the left button on the mouse is then clicked thereby selecting the link. When the link is selected, the user is then connected to the second web site, BBB Company's web site. From BBB Company's web page shown in FIG. 4, if the user wants to buy BBB Company's product, WWW soft, the user must then position the pointer over the link 6 and once again select to connect to the linked page. Similarly, if the user wanted to connect to obtain additional information on BBB Company's product WWW soft, then the user would have to position the pointer over the link 7 and use the mouse to select the link to connect to the next page.

Figure 3:
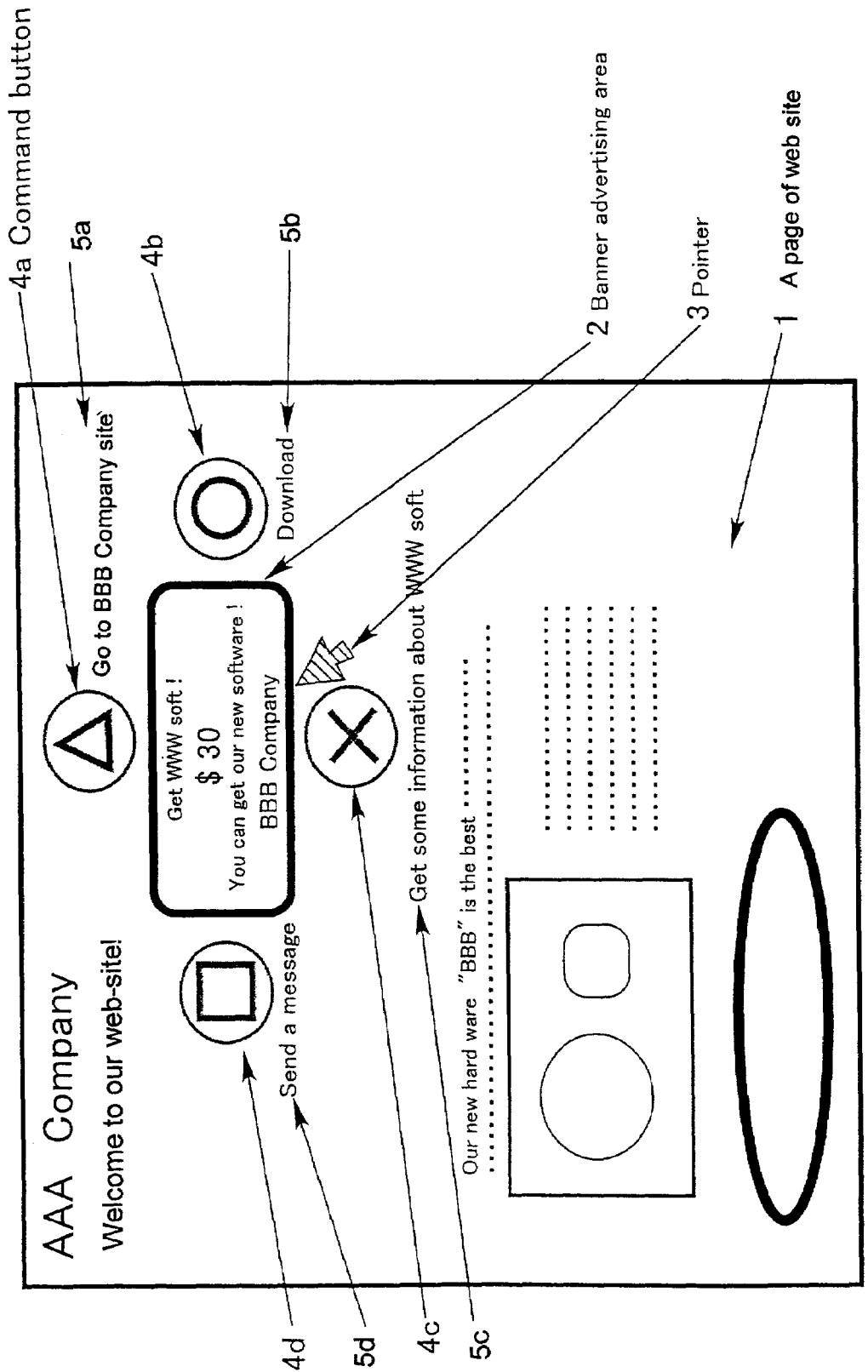
FIG. 3 shows the guidance diagrams overlaid on the AAA Company's web site with the options displayed beneath each corresponding guidance diagram.
Figure 5:
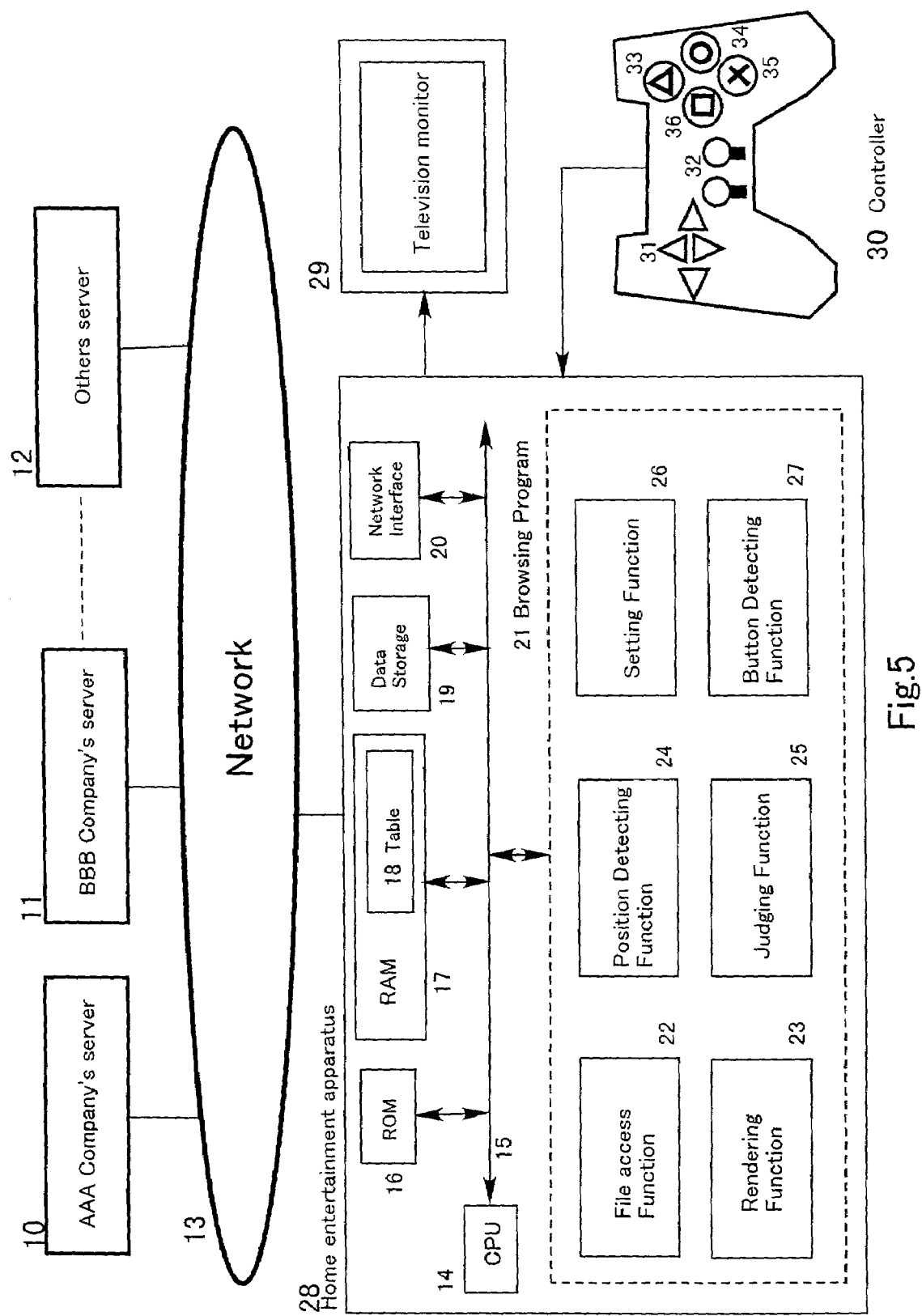
FIG. 5 is a schematic diagram showing the connection of servers, such as AAA Company's server and BBB Company's server to a network to which a home entertainment apparatus is connected.

However, under the present invention, as shown in FIG. 3, a user on the AAA Company web site positions the pointer over the banner. The guidance diagrams 4a–4d then appears overlaid on the web site. The user then need only depress the appropriate button on an input controller 30, as shown in FIG. 5, corresponding to the user's desired action. For example, to download or purchase BBB Company's WWW soft product, the user would depress the button 34 on the controller 30 illustrated in FIG. 5 which corresponds to the icon 4b of the guidance diagram. Under the current invention the user is linked to the appropriate page of BBB Company's web page without first having to access BBB Company's home page and then from there selecting a link to connect to the appropriate web page corresponding to the user's desired action, for example to purchase the WWW soft product or to access additional information regarding WWW soft.

The guidance diagram options may be associated with standard commands. As shown in FIG. 3A, the input controller buttons depicted in the left column of FIG. 3A can be set to correspond to particular standard commands, as shown in the right column of FIG. 3A. The standard commands can be the commands associated with the particular control buttons during normal use of the input controller. Using standardized commands further facilitates network navigation as the user may already be familiar with the standard commands for the input controller buttons.

If there are more commands associated with a particular hyperlink than would be feasible to display in a single guidance diagram, then one of the selectable options from the initial guidance diagram may be to view further selectable options. The further options may be different commands for the input controller buttons or commands not previously displayed for other input controller buttons.

Another feature that may be implemented in the current invention is to allow the user to set preferred controller buttons on the input controller for use in the practice of the current invention. For example where the input controller is a numeric keypad, the user may set the number 2, 4, 8, and 6 keys as his preferred controller buttons for selection of options in the guidance diagrams.

As shown in FIG. 5, the current invention is accomplished incorporating at least six functions, namely a File Access Function 22, a Rendering Function 23, a Position Detecting Function 24, a Judging Function 25, a Setting Function 26, and a Button Detecting Function 27.

As in typical network use, a web site is rendered based on the file received from a host server of a web site requested by a user. For web sites using the current invention, a web page (web site picture) is rendered based on the file received from the web site's host server and a table 18, as shown in FIG. 6, is generated in the RAM 17 of the home entertainment apparatus 28.

Figure 6:
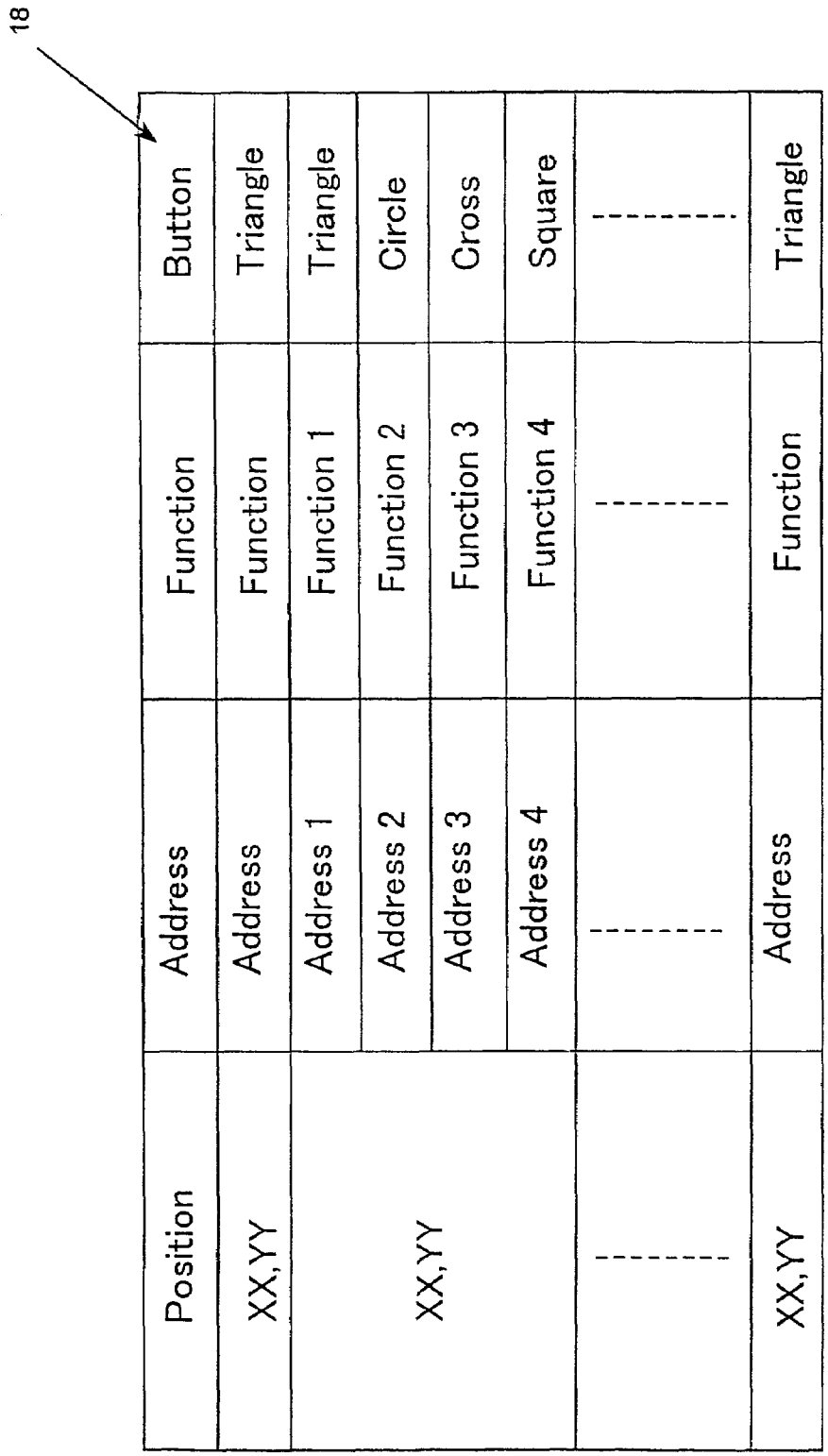
FIG. 6 is a schematic diagram of a position table, for a particular web site.

Initially, the File Access Function 22 accesses a desired file on the host server that includes data for rendering a web page together with the associated table 18 as illustrated in FIG. 6 The Rendering Function 23 then renders a web page 1, as illustrated in FIG. 1.

During operation, the Position Detecting Function 24 detects the position of the pointer 3 on the web page 1, as shown in FIG. 3. If there is an address associated with the position of the pointer, then the Judging Function 25 determines which banner in a page the pointer 3 is oriented to. The Rendering Function 23 receives the information from the Judging Function 25 and then renders the guidance diagram 4a–4d and 5a–5d and imposes it on the web page 1, as shown in FIG. 3.

The Button Detecting Function 27 detects which button of the controller 30 is depressed by the user and sends the result to the Setting Function 26. Utilizing a table 18 as illustrated in FIG. 6, the Setting Function 26 takes the results from the Button Detecting Function 27 and Position Detecting Function 24 to determine what network address is associated with the depressed button. The Setting Function 26 then sets the address sending it to the File Access Function 22.

The File Access Function 22 then receives the network address set by the Setting Function 26 and then accesses the target file at the set address. The Setting Function 26 downloads the information for the target file, including the data for performing the desired action for example, rendering a target BBB Company's web page after the "Go to BBB Company site" button was depressed by the user, or connecting to another web page and executing a function such as "Get some more information about WWW soft," or "Download" as selected by the user, or launching a local application as selected by the user, for example after the user depresses the button for "Send a Message."

Figure 7:
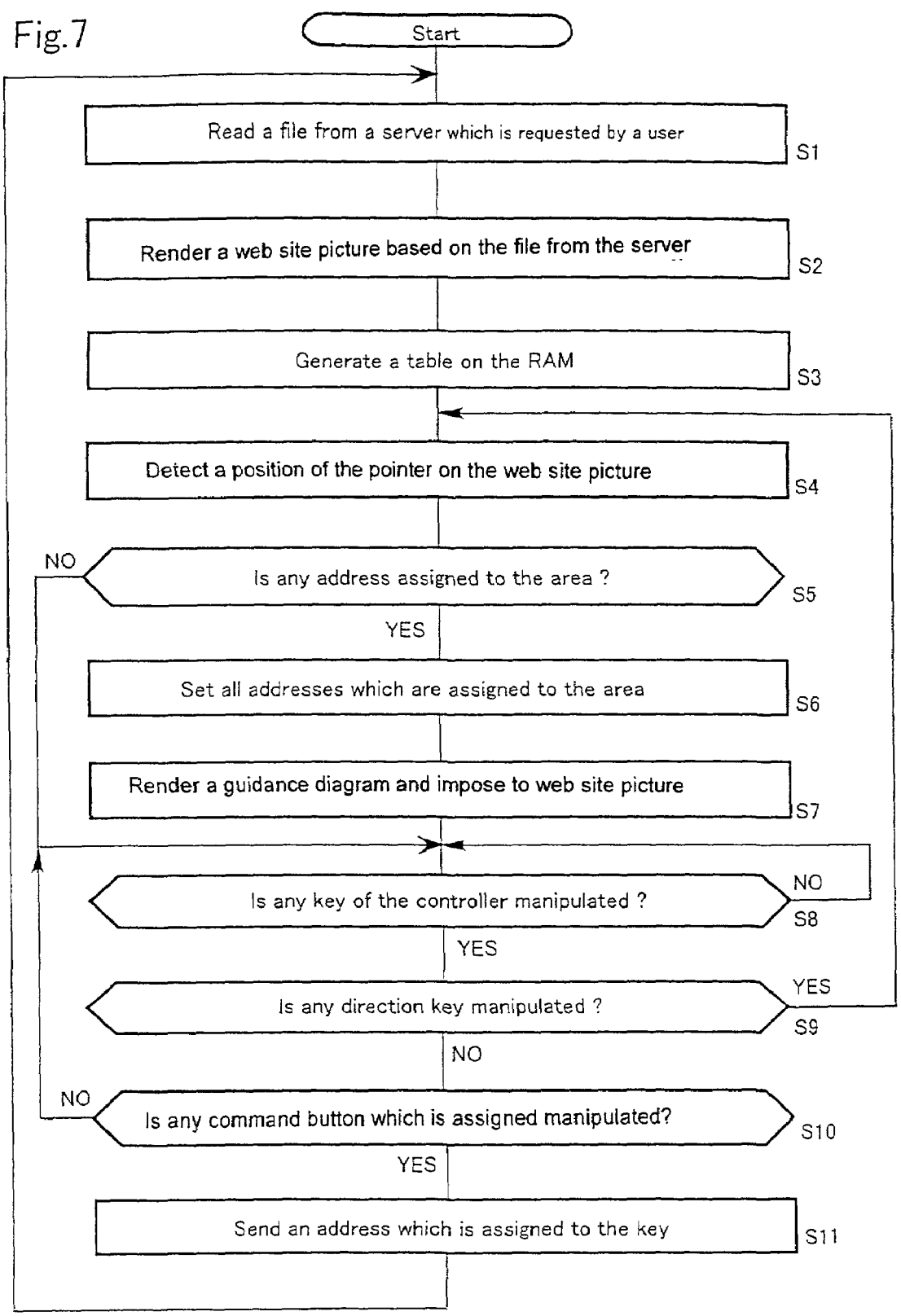
FIG. 7 is a flow chart illustrating the operations performed by a home entertainment apparatus in the current invention.

As shown in FIG. 7, the general operation of the current invention for a user accessing a network location is as follows. The user's input device (such as an entertainment unit) reads a file from a host server requested by the user (S1). The user's input device then renders a web site based on the file received from the host server (S2). A table of the positions, addresses, functions, and input controller buttons for the web site is then generated in the RAM of the user's input device (S3).

The position of the pointer is detected by the input device (S1) and a determination is made as to whether there are any addresses or links associated with the position of the pointer (S5). If there is such an address associated with the position, then the addresses are then set for that position (S6) and a guidance diagram is rendered and imposed on the web site (S7).

After the rendering of the guidance diagram, or after the determination of whether that there are no addresses associated with the pointer position, then a determination is made as to whether any keys (either directional keys or controller buttons) on the input controller buttons are being manipulated (S8). The detection of any manipulated keys continues until there a key is manipulated (S9). If a directional key is manipulated, then the input device again detects the new position of the pointer and continues with the functions as described thus far.

If a directional key is not being manipulated, a determination is made as to whether a controller button for which commands have been assigned is being manipulated (S10). If such a button is being manipulated then the address corresponding to the manipulated button is accessed (S11).

Figure 8:
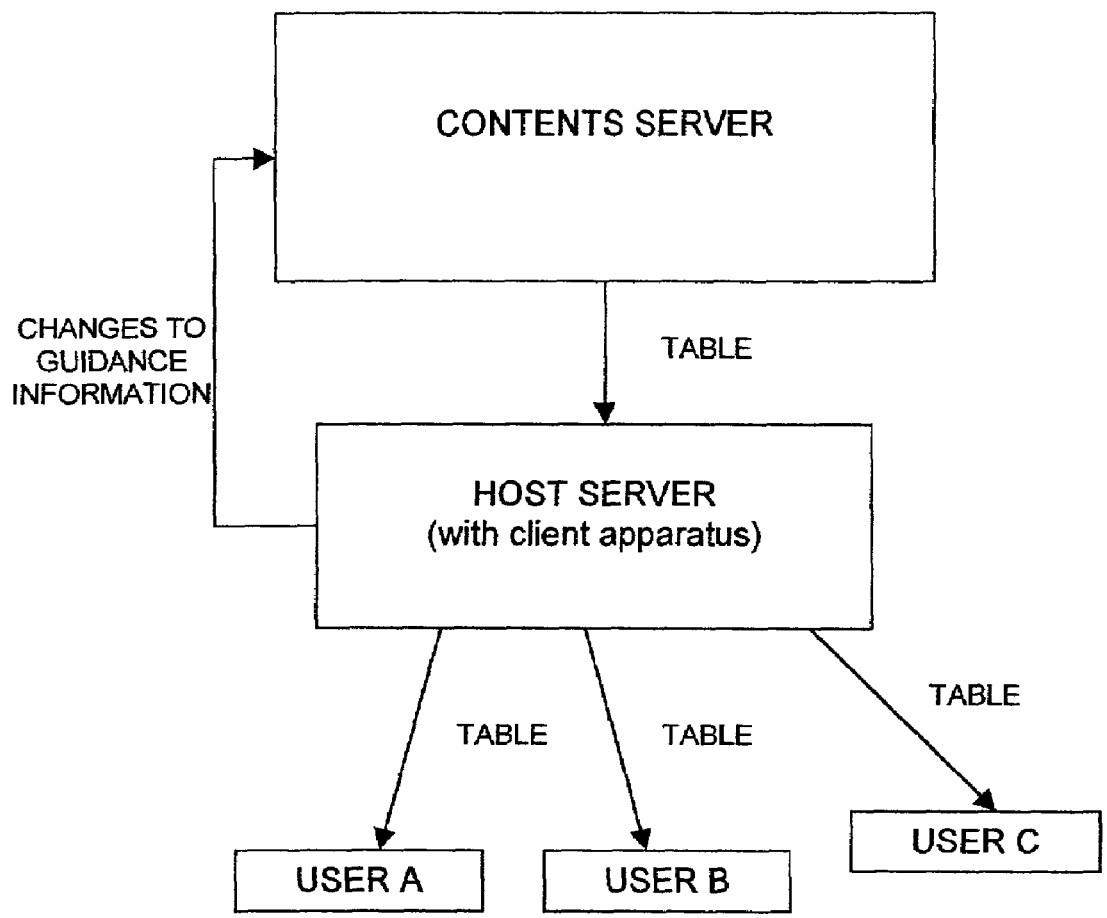
FIG. 8 is a schematic diagram showing the connection of a host server, a contents server, and users.

The host server may have the capability to create and store the table of the positions, addresses, functions, and input controller buttons for the web site that is then generated in the RAM of the user's input device. However, as shown in FIG. 8, this capability may also reside in a contents server which then communicates the table to the host server which in turn generates the table in the RAM of users' input devices.

The host server may be equipped with a client apparatus which retrieves contents from the contents server. Contents such as guidance information, information in reference to the relationship between the positions on the host's web site and addresses, functions, and input controller buttons for the web site, is stored on the contents server. The client apparatus also enables a host to access and change the contents. The contents server generates tables of the positions, addresses, functions, and input controller buttons for the web site which may be generated in the RAM of the user's input device. These tables are then communicated to the host server.

Additions, subtractions, deletions and other modifications of the described embodiment will be apparent to those practiced in the art and are within the scope of the following claims.

What is claimed is:

1. A data processing system for connection to a network comprising, a data processing unit, a display, and a controller, said display capable of displaying a website downloaded from the network and including at least one positionably selectable hyperlink contained on the website display, a storage medium in said data processing unit for storing therein a respective guidance picture associated with one of said at least one positionally selectable hyperlink, said guidance picture containing a plurality of options identified by icons arranged around said one of said at least one positionally selectable hyperlink, said plurality of options including at least an option effecting a connection to a network address specified by a hyperlink other than said one of said at least one positionally selectable hyperlink, each option being selectable by a key on the controller, said key being identified by an icon corresponding to an icon of one option, said controller containing pointer controls for controlling the position of a pointer movable over the display, said data processing unit producing the associated guidance diagram as an overlay graphic presentation on said display website when said pointer addresses a hyperlink.

2. The data processing system as in claim 1, wherein the arrangement of icons around the said one of said at least one positionally selectable hyperlink relates to the arrangement of keys on the controller.

3. The data processing system as in claim 1, wherein said data processing unit terminates the display of the associated guidance picture when the pointer no longer addresses said one of said at least one positionally selectable hyperlink, whereby the guidance pictures appear and disappear as the pointer moves along the screen over hyperlinks.

4. The data processing system as in claim 1, wherein at least some of said options are hyperlinks.

5. The data processing system as in claim 1, wherein at least one of said options is the generation of a new guidance diagram with further options associated with said one of said at least one positionally selectable hyperlink.

6. The data processing system as in claim 1, wherein said guidance diagrams appear quadrilaterally about the hyperlink.

7. The data processing system as in claim 1, whereas said hyperlinks include banner advertisements.

8. The data processing system as in claim 1, wherein said options comprise hyperlinks to another website, hyperlinks to download information from another website and E-mail.

9. The data processing system as in claim 8, wherein the pre-determined duration of time is a system setting that may be adjusted by the user.

10. The data processing system as in claim 1, wherein there is a pre-determined duration of time during which the pointer must be positioned on said one of said at least one positionally selectable hyperlink before the guidance diagram is generated.

11. A method for providing an on-screen guidance diagram in a display of a data processing unit, comprising:
    storing a guidance diagram with a hyperlink in a memory,
    generating an on-screen guidance diagram when a pointer of the data processing unit is positioned over a selectable hyperlink on a server page,
    said guidance diagram containing a plurality of options identified by icons arranged around said hyperlink, said plurality of options including at least an option effecting a connection to a network address specified by a hyperlink other than said hyperlink, each option being selectable by a key on the controller, said key being identified by an icon corresponding to an icon of one option,
    overlapping the guidance diagram on the server page,
    terminating the display of the guidance diagram when the pointer of the data processing unit is no longer positioned over the selectable hyperlink on the server page.

12. The method as in claim 11 wherein the arrangement of icons around the hyperlink relates to the arrangement of keys on the controller, and further comprising the step of selecting an option.

13. The method for providing on-screen guidance diagrams as in claim 11 wherein the data for generating the guidance diagrams is stored on a host server for a server page and further comprising the step of downloading to the data processing unit the guidance diagram simultaneously with the server page information.

14. The method as in claim 11 and further comprising:
    a controller with control keys, and wherein at least some of the control keys are identified with icons corresponding to icons contained in the guidance diagram, and further comprising the step of:
    selecting a particular option in the guidance diagram by manipulation of the key having the corresponding icon on the controller.

15. The method as in claim 14, wherein said icons are standardized for standard options in all of the guidance diagrams.

16. A contents server comprising: a storage medium and a processor, wherein the storage medium is capable of storing information on relationships between hyperlink positions on a web site and addresses, functions, and input controller buttons for the web site, wherein said processor uses said stored information to generate a table of options associated with a hyperlink and wherein said processor communicates said table to a host server, the host server communicating said table to a user input device that generates a guidance diagram on the web site containing a plurality of options identified by icons arranged around the hyperlink, said plurality of options including at least an option effecting a connection to a network address specified by a hyperlink other than the hyperlink, each option being selectable by a key on a controller connected to the host server, said key being identified by an icon corresponding to an icon of one option.

* * * * *